(12) United States Patent
Castro Mejía

(10) Patent No.: US 11,734,361 B1
(45) Date of Patent: Aug. 22, 2023

(54) SYSTEMS AND METHODS FOR STRUCTURE-INDEPENDENT CATEGORIZATION OF BINARY DOCUMENTS

(71) Applicant: Collibra Belgium BV, Brussels (BE)

(72) Inventor: Sergio Lohengrin Castro Mejía, Brussels (BE)

(73) Assignee: Collibra Belgium BV, Brussels (BE)

( * ) Notice: Subject to any disclaimer, the term of this patent is extended or adjusted under 35 U.S.C. 154(b) by 0 days.

(21) Appl. No.: 17/722,191

(22) Filed: Apr. 15, 2022

(51) Int. Cl.
*G06F 16/906* (2019.01)
*G06F 16/93* (2019.01)

(52) U.S. Cl.
CPC ........... *G06F 16/906* (2019.01); *G06F 16/93* (2019.01)

(58) Field of Classification Search
CPC .............................. G06F 16/906; G06F 16/93
USPC ........................................................ 707/740
See application file for complete search history.

(56) References Cited

U.S. PATENT DOCUMENTS

| | | | | |
|---|---|---|---|---|
| 7,117,432 | B1 * | 10/2006 | Shanahan | G06F 16/353 715/236 |
| 9,720,925 | B1 * | 8/2017 | Lawson | G06F 40/194 |
| 10,885,121 | B2 * | 1/2021 | Takuma | G06F 16/2237 |
| 11,204,907 | B2 * | 12/2021 | VanderSpek | G06F 16/24568 |
| 2003/0120647 | A1 * | 6/2003 | Aiken | G06F 16/325 |
| 2018/0074786 | A1 * | 3/2018 | Oberbreckling | G06F 16/25 |
| 2018/0096060 | A1 * | 4/2018 | Peled | G06F 16/35 |
| 2021/0027015 | A1 * | 1/2021 | Roberts | G06F 9/547 |
| 2021/0034682 | A1 * | 2/2021 | Manggala | G06Q 30/0641 |
| 2022/0121884 | A1 * | 4/2022 | Zadeh | G06V 10/764 |

OTHER PUBLICATIONS

Jin, Wesley, et al., "Binary Function Clustering using Semantic Hashes", ICMLA 2012, Boca Raton, FL, Dec. 12-15, 2012, IEEE Computer Society, pp. 386-391.*

Haq, Irfan, et al., "A Survey of Binary Code Similarity", ACM Computing Surveys, vol. 54, No. 3, Article No. 51, Apr. 17, 2021, pp. 1-38.*

Martinez, V. Gayoso et al., "State of the Art in Similarity Preserving Hashing Functions," Information Processing and Cryptography (TIC), Institute of Physical and Information Technologies (ITEFI) Spanish National Research Council (CSIC), Madrid, Spain, 7 pgs, Apr. 15, 2022.

Breitinger, Frank et al., "Similarity Preserving Hashing: Eligible Properties and a New Algorithn", MRSH-v2, da/sec Biometrics and Internet Security Research Group Hochschule Darmstadt, Darmstadt, Germany, pp. 167-182, Apr. 15, 2022.

Kornblum, Jesse "Identifying almost identical files using context triggered piecewise hashing," ManTech SMA, Science Direct, Elsevier, Digital Investigation 3S (2006) S91-S-97.

* cited by examiner

*Primary Examiner* — Robert Stevens
(74) *Attorney, Agent, or Firm* — Perkins Coie LLP

(57) ABSTRACT

The present disclosure is directed to systems and methods for recognizing and categorizing documents. In some embodiments, a computing system can access an archetype template and a corresponding label for each targeted category. The computing system can analyze a set of target binary documents based on a set of sequenced and contextually triggered hashing operations. The target binary documents can be categorized based on comparing the analysis results to the archetype templates or results derived from the archetype templates.

20 Claims, 8 Drawing Sheets

SYSTEMS AND METHODS FOR STRUCTURE-INDEPENDENT CATEGORIZATION OF BINARY DOCUMENTS

TECHNICAL FIELD

The present disclosure relates to data categorization techniques.

BACKGROUND

Entities maintain large amounts of data that may be disorganized and/or incomplete. While entities require large amounts of data for operation, typically only a fraction of such data is structured, contains significant metadata, and/or is in a textual form. For example, a company may maintain and/or process various different types of documents, such as emails, contracts, licenses, documents with inserted media, process documents, product specifications, other legal documents, transaction records, or the like. Different types of documents can have categorically different content and/or format due to the nature/function thereof. Even within each type or category, the documents can have different structures and formats due to various factors, such as authors, contexts, processing environments, or the like. Some of the documents may even be incomplete.

These factors present additional difficulties to the entities that seek to understand, process, and analyze the maintained data. As such, there is an increased need for systems and methods that can address the challenges of modern-day data processing and categorization/recognition.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
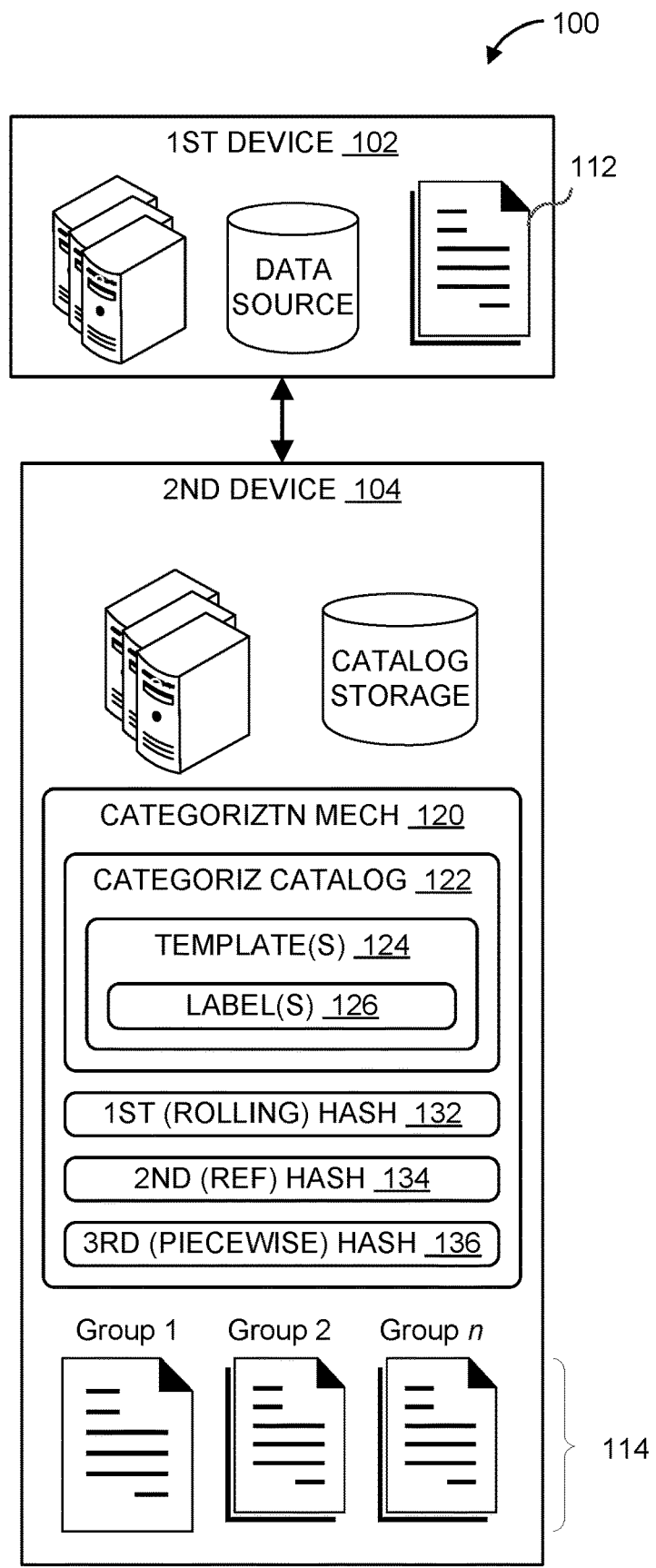
FIG. 1 illustrates an example environment in which a computing system with a structure-independent categorization mechanism may operate in accordance with one or more embodiments of the present technology.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to data/document categorization techniques. A computing system can include a structure-independent categorization mechanism (e.g., hardware, software, firmware, or a combination thereof) configured to categorize binary documents (e.g., non-textual documents, such as pdf files, sound documents, images, or the like) independent of any structural requirements for the corresponding document categories. In other words, the computing system can categorize binary documents having unstructured content or non-uniform structures for the content. The structure-independent categorization mechanism can implement a context-based piecewise hashing or a similarity-preserving-hashing to apply categorization to the non-uniform structured binary documents. A set of template documents can be manually categorized with certain labels to form a categorization catalog. The context-based piecewise hashing can be used to identify and categorize variations of the template documents with the same labels. Details regarding the structure-independent categorization mechanism are described below.

The structure-independent categorization mechanism leveraging the context-based piecewise hashing can provide automated categorization of binary documents. While conventional systems may automatically categorize text documents by relying on tokenization to identify similar sentences and/or to leverage natural language understandings. However, such techniques cannot be applied to binary documents (e.g., pdf files, sound files, images, or the like) that do not have text-based content. Instead, embodiments of the current technology can leverage the context-based piecewise hashing to examine patterns and/or similarities of across binary bitstreams, thereby allowing implementation of automated categorization of binary documents.

The context-based piecewise hashing can be implemented (by, e.g., executing the corresponding instructions via one or more processors) relatively quickly (e.g., in a few days instead of months) by leveraging similarity-preserving hashing techniques. Accordingly, the context-based piecewise hashing can be used to identify files that are similar in content as determined using a high percentage (e.g., according to a predetermined threshold, template, or pattern) of overlapping or matching binary phrases (e.g., bytes) that may or may not be at the same positions within the corresponding files. The context-based piecewise hashing can be implemented using low level mathematic operations (e.g., additions, multiplications, or the like) and byte operations, thereby providing fast and reliable execution results while using relatively small amounts of resources.

In one or more embodiments, the structure-independent categorization mechanism can determine a template document that has been categorized (via, e.g., manual categorization) with predetermined or user-specific labels. The structure-independent categorization mechanism can use the context-based piecewise hashing to compare a set of target documents to the template. Accordingly, the comparison using the context-based piecewise hashing can identify a group of documents that have sufficient overlaps (e.g., sufficient number of binary phrases matching) the template.

As an illustrative example, an entity may have a certain set or type of legal documents that are used as templates (e.g., non-disclosure agreements (NDA) or licensing agreements). A database of legal documents can contain some instances of such documents but with inserted media, such as for added signatures or notes. A pre-categorization of the template document with a label "NDA" can be provided for analyzing the legal documents stored in the database. Using the context-based piecewise hashing, a computing system can compare the binary phrases between the template NDA with each of the documents in the legal database. Accordingly, the computing system can identify documents that have binary phrases that correspond to language commonly used or required by NDAs as indicated by the template. Moreover, using the context-based piecewise hashing, the computing system can focus on the degree of overlap between the template and the analyzed legal documents without considering the sequence, the structure, and/or relative locations of such phrases within each document. In other words, the computing system can identify overlaps even when the matching binary phrases are found in different places within the documents, such as due to different formatting, different phrasing, insertions/deletions of the media, or the like.

FIG. 1 illustrates an example environment in which a computing system 100 with a structure-independent categorization mechanism may operate in accordance with one or more embodiments of the present technology. The computing system 100 may include one or more computing devices, such as a first device 102 and/or a second device 104. For example, the first device 102 can correspond to a client computing system (e.g., a computer, a server, a database, or the like). The second device 104 can correspond a service-provider system (e.g., a computer, a server, a database, a cloud computing system, or a combination thereof) communicatively coupled to the client computing system via a communicative network (e.g., Internet, local area network, wide area network, cellular network, or the like). In some embodiments, the first device 102 and the second device 104 can be implemented a using one device or a network of devices. In other embodiments, the second device 104 can be implemented alone or various aspects of the second device 104 can be implemented at the first device 102.

The first device 102 can provide a set of target documents 112. The target documents 112 can include files that at least partially include non-textual content. For example, the target documents 112 can include binary files (e.g., pdf files, sound files, images, or the like). Also, the target documents 112 can include text files that include non-text portions, such as images, comments, markings, signatures, or the like. The target documents 112 may include different types of categories of documents. Given the common function or goal associated with each category, documents within one category can have similar content. However, the documents within one/each category may be unstructured. In other words, different documents within one category can have different portions and/or have the matching portions at different locations.

The second device 104 can be configured to process the target documents 112 to group the target documents 112 according to one or more categories. Stated differently, the second device 104 can include a categorization mechanism 120 (e.g., one or more functions, hardware circuits, software instructions, firmware, a machine-learning model, or a combination thereof) configured to generate one or more categorized groupings 114 by categorizing or grouping the target documents 112. The categorization mechanism 120 can generate the categorized groupings 114 according to similarities or patterns within the target documents 112. For example, the categorization mechanism 120 can be configured to analyze the binary bit patterns of the target documents 112 to identify legal documents (e.g., contracts, NDAs, license, etc.), copyright-protected content, personally identifiable information (PII), specific images or sounds (e.g., logos), or other types of content categories. As described above, in some embodiments, the categorization mechanism 120 can be at least partially implemented using the first device 102 (e.g., at client location or server).

In some embodiments, the categorization mechanism 120 can access a categorization catalog 122 that identifies categorization templates 124 and corresponding labels 126. Each of the categorization templates 124 can include a document that exemplifies a corresponding category. The categorization mechanism 120 can use the categorization templates 124 as guides in identifying similar types of documents in the target documents 112. The categorization mechanism 120 can assign the labels 126 to the documents having sufficient (e.g., according to predetermined thresholds) overlaps or similarities with the corresponding templates 124. In some embodiments, one or more of the target documents 112 may be assigned multiple labels. For example, one document may be labeled as a contract, as including a specific logo, and as having therein PII. Additionally or alternatively, the categorization mechanism 120 can derive scores (e.g., likelihood values) for each assigned label.

In categorizing the documents, the categorization mechanism 120 can use, as an example, one or more hashing functions (e.g., a first hash 132, a second hash 134, and/or a third hash 136) to compare the templates 124 to the target documents 112. In one or more embodiments, the hashing functions can correspond to context-triggered piecewise hashing. Overall, the set of hashing functions can deterministically return a key for a given value. In generating the key, intervals used to analyze and trigger the hashing functions can be varied according to the input (e.g., one or more contextual determinations associated with the document). The categorization mechanism 120 can implement the hashing using a function defined in terms of one or more other sub-functions that each apply to an interval. Stated differently, the hashing functions can be sequenced such that (1) the second hash 134 can be triggered according to an interval and/or results from the first hash 132 and (2) the third hash 136 can correspond to and/or be triggered by the result of the second hash 134 or a combination of the first hash 132 and the second hash 134.

As an illustrative example, the first hash 132, the second hash 134, and the third hash 136 can be implemented as a rolling hash, a reference hash, and a context-triggered piecewise hash, respectively. The rolling hash can traverse the input (e.g., bitstream corresponding to one of the target documents 112) using one or more windows and calculate the hashes of the windows. The rolling hash can be implemented using low-level math (e.g., addition, multiplication, etc.) and/or bit operations (e.g., shifts, masks, or the like). The reference hash (e.g., MD5, FNV, or the like) can calculate the hash of an input interval, such as when the rolling-hash fulfills a triggering condition. The context-triggered piecewise hash can concatenate portions of the reference hashes (e.g., LS6B of each hash value). Details regarding the categorization mechanism 120 and the hashing are described below.

Figure 2:
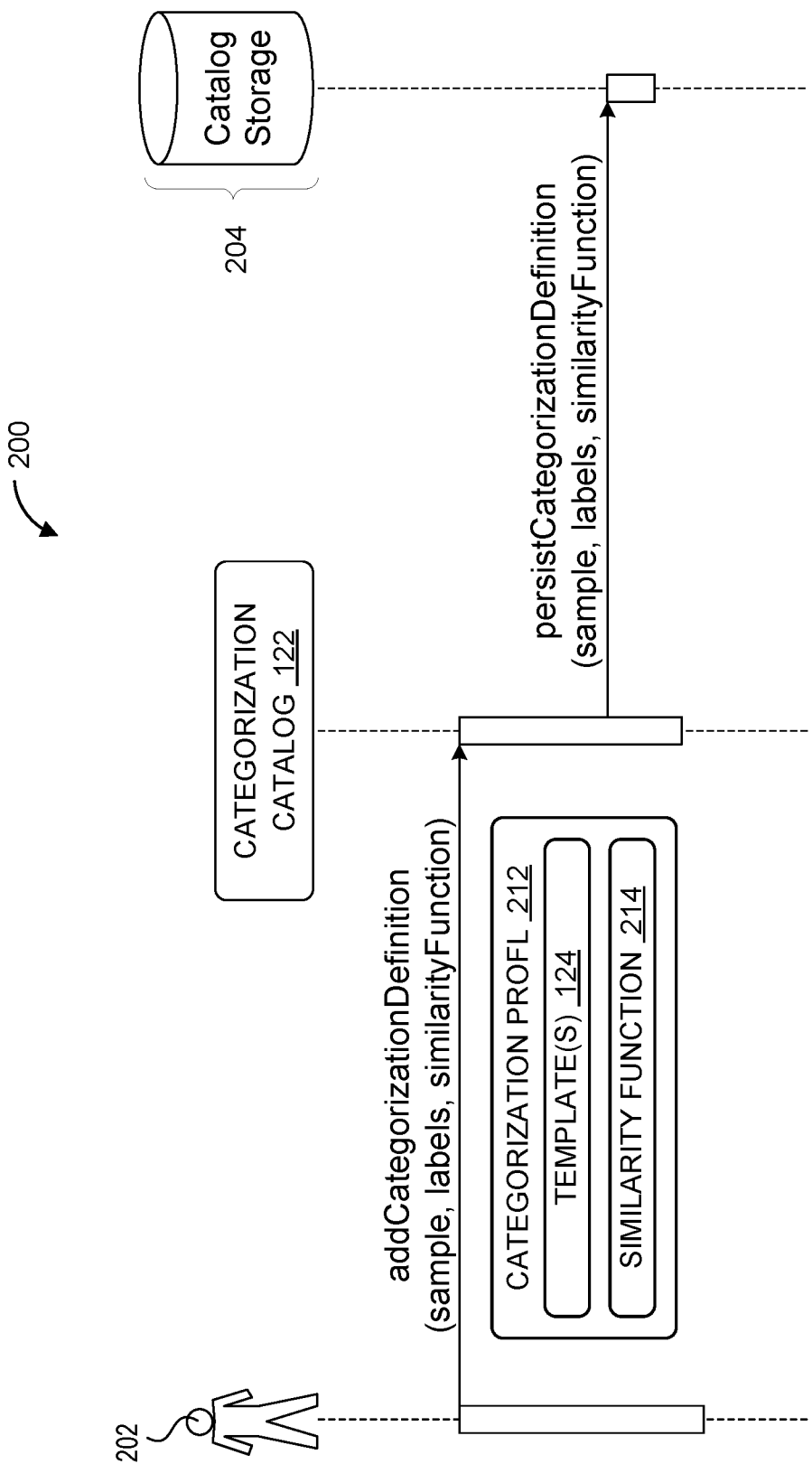
FIG. 2 illustrates an example process for adding categories in accordance with one or more embodiments of the present technology.
Figure 3:
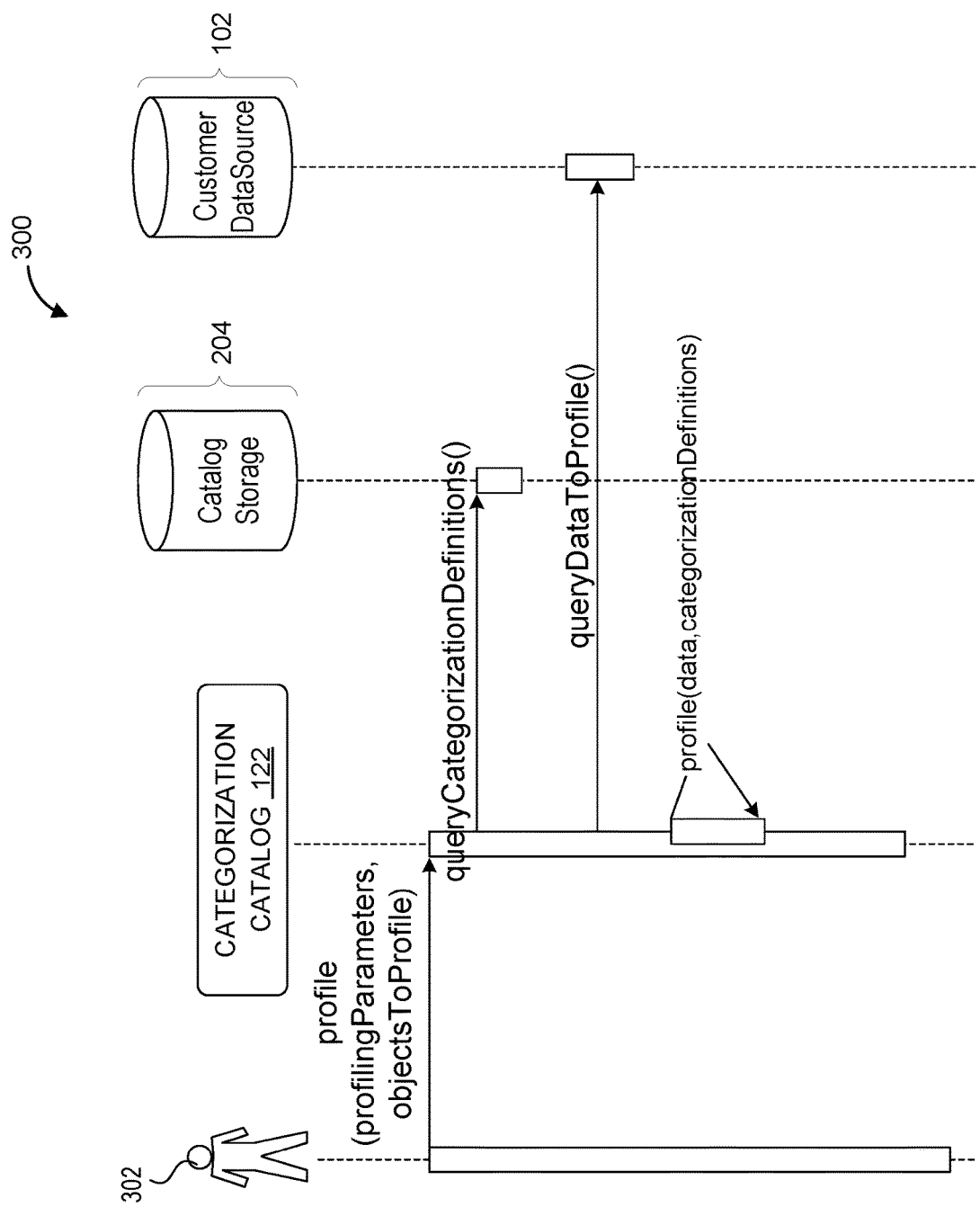
FIG. 3 illustrates an example process for profiling binary documents in accordance with one or more embodiments of the present technology.

The computing system 100 may categorize binary data based on two stages. The first stage can correspond to adding categorizations, and the second stage can correspond to profiling binary documents with pre-defined categorizations. FIG. 2 illustrates an example process 200 for adding categorizations, and FIG. 3 illustrates an example process 300 for profiling binary documents, both in accordance with one or more embodiments of the present technology.

Referring to FIG. 2, the process 200 can correspond to a user 202 (e.g., a catalog user, a client, and/or a device user for the first device 102 of FIG. 1, the second device 104 of FIG. 1, or a combination thereof) defining the operational parameters or details for categorizing the target documents 112 of FIG. 1. The user 202 may provide, via a user interface implemented through the first device 102 and/or the second device 104, the operational parameters and/or the details that correspond to examples or samples for defining targeted categories.

In some embodiments, the computing system 100 can interact with the user 202 and receive a categorization profile 212, such as using an adding function/command. The categorization profile 212 can include information defining a target category for categorizing or identifying corresponding subgroups within the target documents 112. The categorization profile 212 can include one or more instances of the categorization templates 124 of FIG. 1 and/or the corresponding labels 126 of FIG. 1. The categorization profile 212 may further include a similarity function 214 for each category. The similarity function 214 can include thresholds, rules, equations, operations, and/or related information used to measure or define similarities or overlaps between documents. For example, the similarity function 214 can include a threshold degree of overlaps in binary strings or phrases between a corresponding template and a target document. Also, the similarity function 214 can include a distance function, such as a minimum edit distance function, used to compare similarities between documents or portions thereof. Additionally or alternatively, the similarity function 214 can be configured to calculate a confidence measure (using, e.g., the overlaps in binary strings/phrases and/or the distances) that a target document may be similar to the corresponding template. The categorization profile 212 may further include one or more optimization rules, such as for applying binary data categorization to specified locations (e.g., columns and/or tables).

The computing system 100 can include the received categorization profile 212 in the categorization catalog 122. The categorization catalog 122 and/or the categorization profile 212 may be associated with the user 202. The computing system 100 can store the categorization profile 212 and/or the categorization catalog 122 in a catalog storage 204 (e.g., a database or a memory for the second device 104). The categorization profile 212 can be persisted in the catalog storage until the categorization operation.

Referring to FIG. 3, the computing system 100 can use the persisted profiles (e.g., the categorization profiles 212 of FIG. 2 added into the categorization catalog 122 of FIG. 1) to profile and categorize the target documents 112 of FIG. 1. In some embodiments, the computing system 100 (via, e.g., the categorization mechanism 120 of FIG. 1) can categorize the target documents 112 using a process similar to advanced data type detections that use regular expressions to assign data types to text fields. For binary documents, the computing system 100 can use the similarity function 214 of FIG. 2 to detect the types of binary data and categorize it accordingly (via, e.g., the corresponding label 126 of FIG. 1).

The process 300 can correspond to a user 302 (e.g., a catalog user, a client, and/or a device user for the first device 102 of FIG. 1, the second device 104 of FIG. 1, or a combination thereof) querying the categorization catalog 122 for existing instances of the categorization profile 212. The query can be received by the catalog storage 204, and the computing system 100 can identify the qualifying instances of the categorization profile 212. The user 302 can select one or more of the categorization profiles 212 for use in the document profiling operation, which can be initiated by querying the data. For example, the second device 104 can communicate with a customer data source (e.g., the first device 102) by sending a data query. The second device 104 can receive the query response from the customer data source as the target documents 112. The second device 104 can profile the target documents 112 by identifying groupings or categorizations therein according to the user selected instances of the categorization profiles 212.

The second device 104 can profile the documents by identifying similarities between the target documents 112 and the categorization profiles 212. For example, the second device 104 can use the categorization mechanism 120 of FIG. 1 to identify matching binary strings or phrases (e.g., a binary sequence having a limited or a predefined length) between the target documents 112 and the categorization profiles 212. The categorization mechanism 120 can determine that one or more of the target documents 112 are sufficiently similar (e.g., according to the similarity function 214 of FIG. 2) to each categorization profile 212 based on matching binary phrases.

Figure 4A:
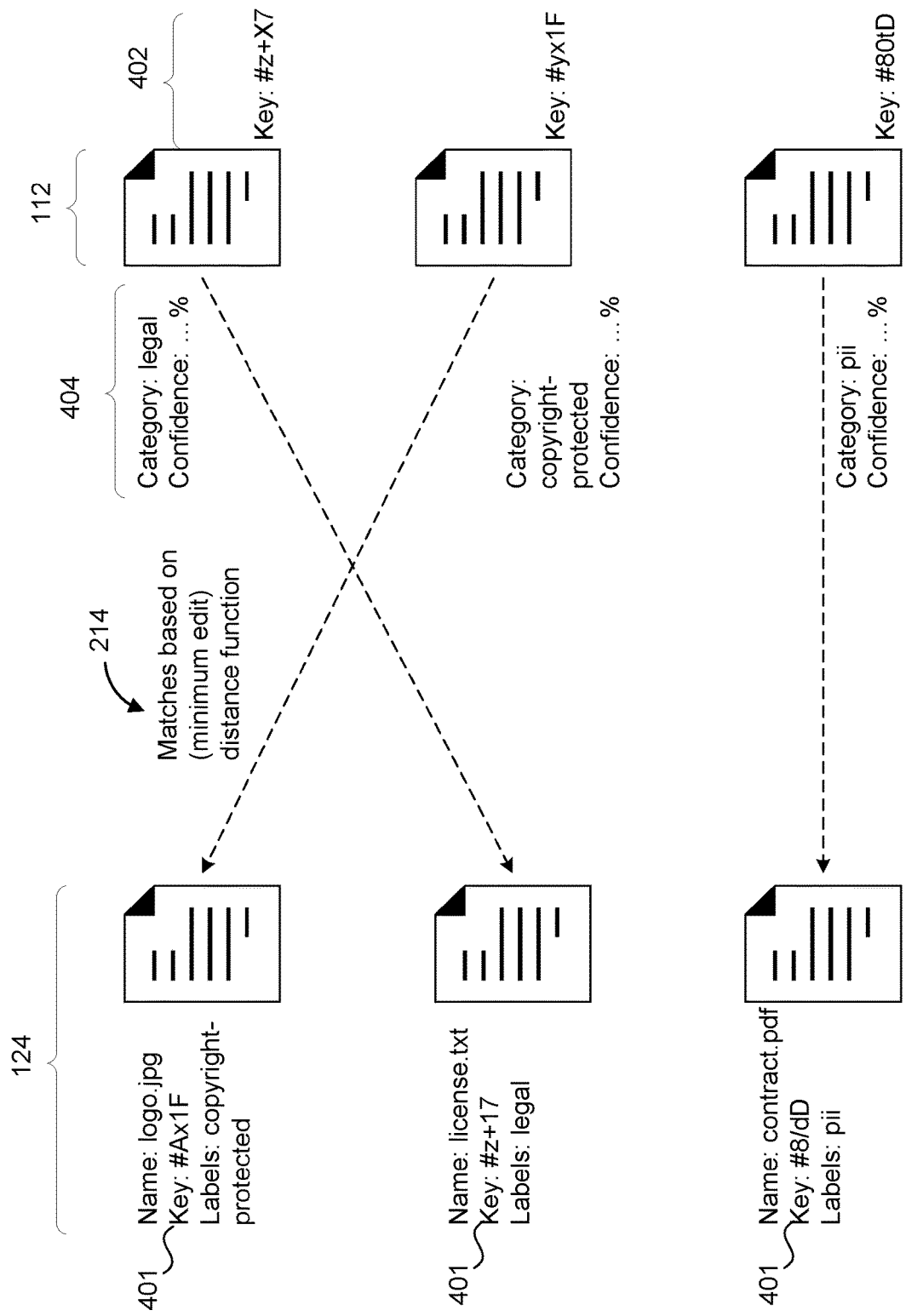
FIG. 4A illustrates an example profiling process in accordance with one or more embodiments of the present technology.

FIG. 4A illustrates an example profiling process in accordance with one or more embodiments of the present technology. The illustrated example corresponds to a set of the categorization templates 124 that include a logo file, a license document, and a contract. The categorization templates 124 can include copyright-protected, legal, and pii, respectively, for the labels 126 of FIG. 1. The computing system 100 can obtain a template key 401 (e.g., a hashing result) for each template, such as by using the categorization mechanism 120 of FIG. 1 and/or one or more of the corresponding hashing functions to derive the key. The computing system 100 can obtain the template documents and store the categorization templates 124 as described above for FIG. 2.

The illustrated example further corresponds to a profiling operation or categorization of three target documents. The computing system 100 can obtain the target documents and implement the profiling operation as described above for FIG. 3. Through the profiling operation (via, e.g., a context-based piecewise hashing described below), the computing system 100 can derive target keys 402 (e.g., hashing results) for the target documents 112. The computing system 100 can use the similarity function 214 to compare the target keys 402 to the template keys 401 to generate categorization results 404 (e.g., matching instances of the labels 126 and/or corresponding confidence measures). For example, the categorization mechanism 120 can be configured to calculate edit distances between the target keys 402 and the template keys 401. The categorization mechanism 120 can assign a categorization label to an analyzed document when the minimum edit distance between the compared keys satisfies a condition or a rule. In some embodiments, the categorization mechanism 120 can assign a categorization label having the lowest edit distance to a corresponding template and/or one or more labels with the edit distance that is less a predetermined maximum distance.

Figure 4B:
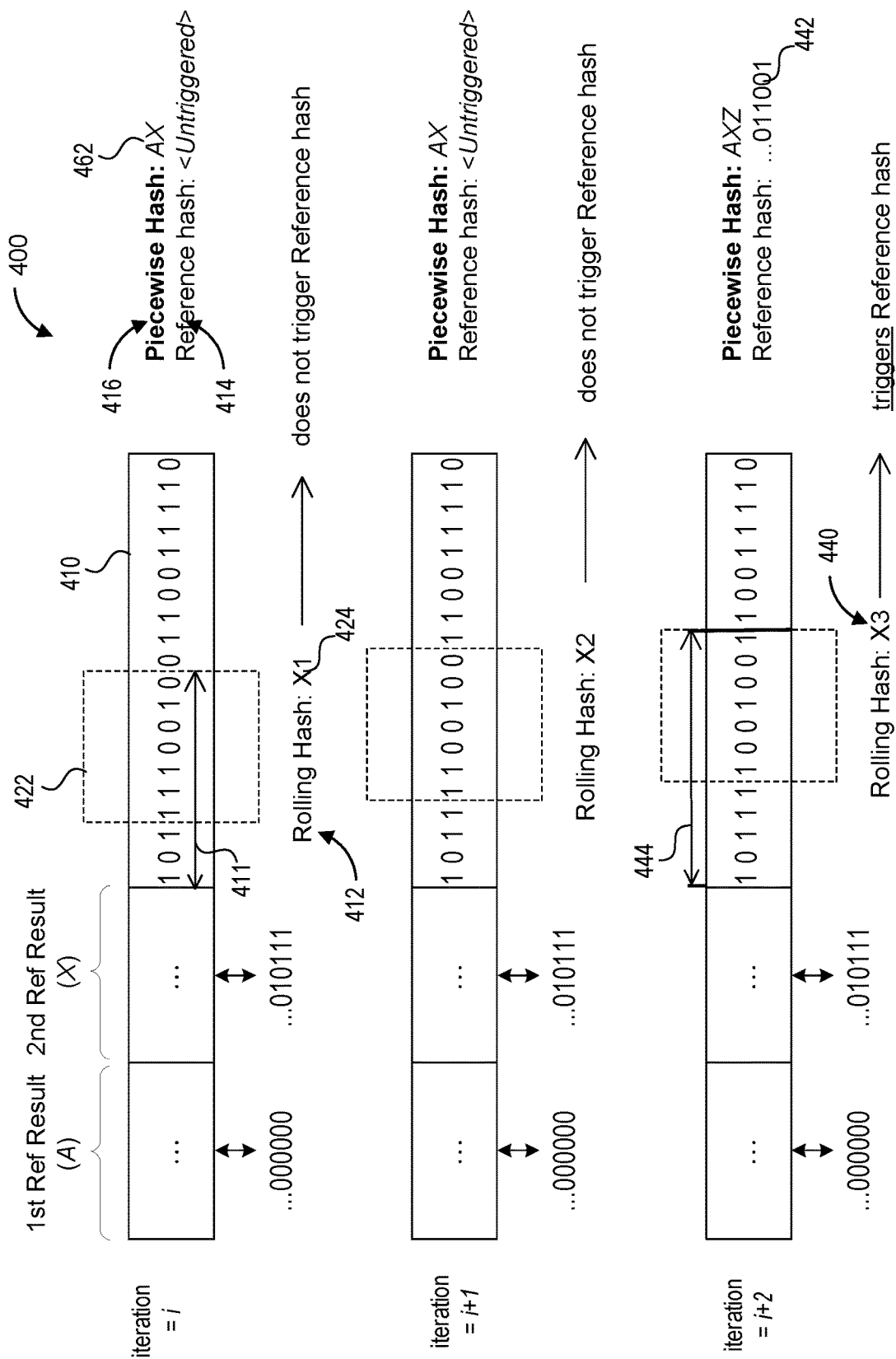
FIG. 4B illustrates an example operation for a context-based piecewise hashing in accordance with one or more embodiments of the present technology.

In some embodiments, the categorization mechanism 120 can use a set of hashing functions 400 to identify matching binary phrases, such as in implementing the hashing functions and/or the similarity function. FIG. 4B illustrates an example operation for a context-based piecewise hashing in accordance with one or more embodiments of the present technology. The context-based piecewise hashing can correspond to the set of hashing functions.

For the example illustrated in FIG. 4B, the set of hashing functions 400 can include a rolling hash 412, a reference hash 414, and a piecewise hash 416 (e.g., instances of the first hash 132, the second hash 134, and the third hash 136, respectively, illustrated in FIG. 1). The rolling hash 412 can be configured to compute the hash for a portion of an input stream 410 (e.g., binary stream corresponding to the target document under analysis) within a rolling window 422. The categorization mechanism 120 incrementally/iteratively move the rolling window 422 from one portion (e.g., a beginning of the document/content) to a different portion (e.g., an end of the document/content) and update the hash. In other words, the categorization mechanism 120 can determine the effects of the information (e.g., bit/byte) removed from or added within the rolling window 422 across the iterative traversing of the rolling window 422. Accordingly, the categorization mechanism 120 can perform the iterative analysis using the rolling window 422 using low-level math operations and bit/byte-wise operations and without recomputing the hash at every iteration.

The categorization mechanism 120 can track the information or an interval thereof that is read from the input stream 410 and analyzed using the rolling window 422. In other words, the categorization mechanism 120 can track the analyzed data by concatenating the information exiting from the rolling window 422 across the iterations. The categorization mechanism 120 can apply the reference hash 414 (e.g., a predetermined hashing function, such as MD5, FNV, or the like) to the tracked information when one or more rolling hash results 424 satisfy one or more reference trigger conditions 440 (e.g., known patterns that are characteristic or common in corresponding category of documents). The reference hash 414 can be used to compute reference results 442 from the tracked information.

As an illustrative example, the categorization mechanism 120 can track an analyzed portion 411 of the input stream 410 that has been included in or analyzed by the rolling window 422 since the last triggering of the reference hash 414 (e.g., since deriving the second reference hash result). Accordingly, with each iteration, the categorization mechanism 120 can add to the analyzed portion 411 until when the rolling hash results 424 satisfy the reference trigger condition 440. The categorization mechanism 120 can establish a reference segment 444 as the analyzed portion 411 when the triggering condition is/are satisfied. The categorization mechanism 120 can apply the reference hash 414 to the reference segment 444 to compute the reference result 442 for the segment. Accordingly, the triggering interval/timing for the reference hash 414 may be dynamically or contextually adjusted (e.g., not fixed) according to a size of the rolling window 422 and/or the reference trigger condition 440.

The categorization mechanism 120 can use the reference results 442 for the piecewise hash 416 in generating a piecewise hash result 462, such as by concatenating the reference results 442 or one or more portions thereof (e.g., n least-significant bits (LSnB) of each result, n=1, 2, 3, 4, 5, 6, ...) across iterations or triggering events. For the example illustrated in FIG. 4B, LS6B of the reference result 442 from the currently triggered reference hash is represented by 'Z', which is concatenated to the LS6B of the preceding reference hash results (represented by 'A' and 'Z') that correspond to the preceding reference segments. The piecewise hash result 462 (e.g., the final set of reference results 442) for a target document can correspond to the target key 402 of FIG. 4A of the target document.

Accordingly, the categorization mechanism 120 can implement a piece-wise or a segment based hash of the input stream 410 instead of hashing an entirety of the input stream 410 as a single operation. By analyzing the documents in segments, the categorization mechanism 120 can identify matches or similarities of relevant sections while preventing terminal impacts of the differences. Said another way, the categorization mechanism 120 can leverage the set of hashes such that an added/deleted/altered section (e.g., a contract clause or different text surrounding a copy-righted image) is isolated to just that section instead of letting the difference affect the overall comparison analysis. In combination with the similarity function 214 (e.g., matching based on minimum edit distance), the categorization mechanism 120 can use the set of hashes to identify similarities (e.g., separate from and/or in additional to exact matches) in binary documents. Moreover, the categorization mechanism 120 can provide improved speed in determining the similarities in documents by comparing hashes that have shorter lengths by multiple orders of magnitudes in comparison to the corresponding documents.

In some embodiments, the computing system 100 can divide the input stream 410 into one or more blocks having a block size. The block size and the window size can indicate how often the rolling hash may be triggered, such as according to rolling hash mod blockSize=blockSize−1. When the block size is small, the computing system 100 may trigger the hashing operations frequently and the similarity accuracies may be higher. However, the size of the piecewise hash string may converge to that of the original input stream 410. When the block size is too big, the may reduce the size of the piece-wise hash string and improve the calculation efficiencies. However, the accuracy of detecting the similarities may decrease. As such, the computing system 100 can test (via, e.g., machine learning models and a training data set) different block sizes for each category of documents. The computing system 100 can evaluate the block sizes for a give category according to a degree of accuracy. The computing system 100 can use the block size that satisfies a predetermined accuracy measure, such as the block size that provides the satisfactory accuracy with the lowest processing time. The computing system 100 may further generate similarity tables for each of the block sizes and select the one that produces the most accurate score. Alternatively or additionally, the computing system 100 can use a maximum processing duration to effectively provide a lower limit on the block size. In some embodiments, the user 202 can provide the predetermined accuracy measure and/or the maximum processing duration, thereby setting the block size.

Figure 5A:
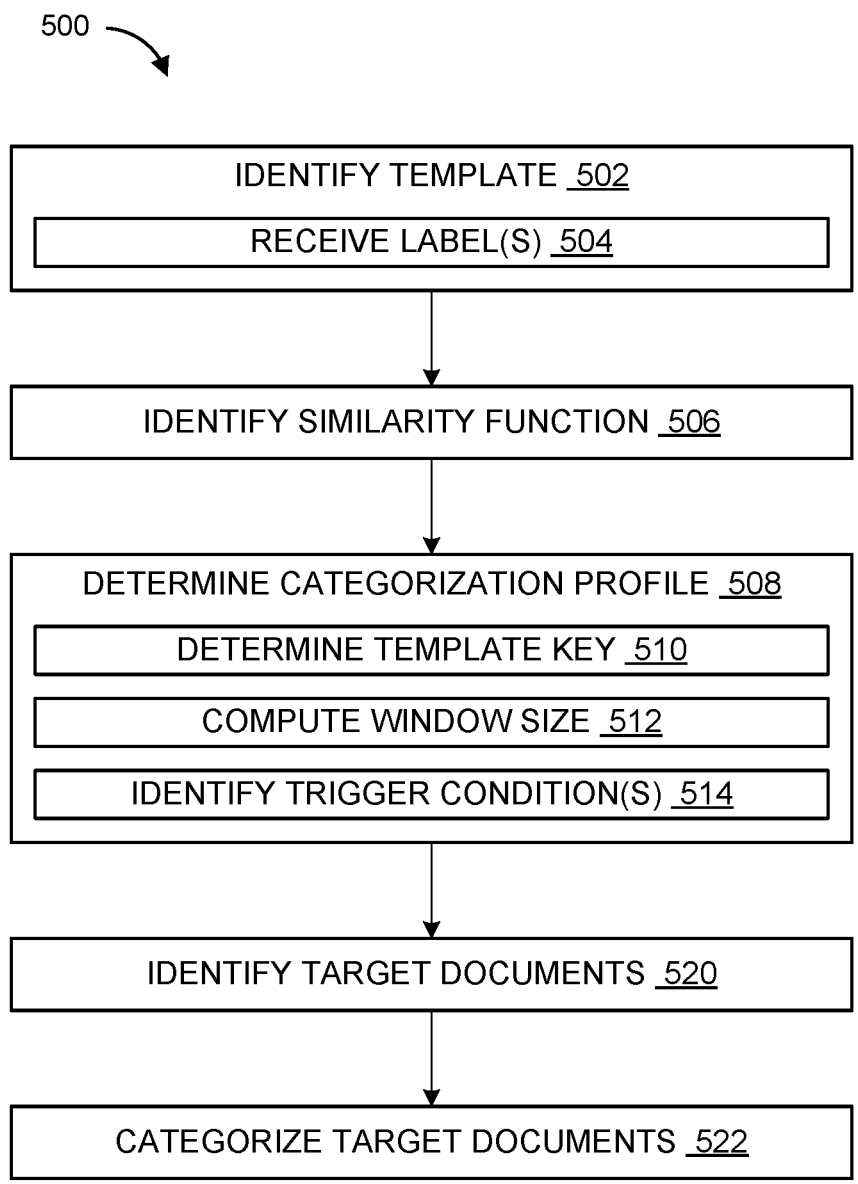
FIG. 5A illustrates an example method for categorizing binary documents in accordance with one or more embodiments of the present technology.

FIG. 5A illustrates an example method 500 for categorizing binary documents in accordance with one or more embodiments of the present technology. The method 500 can be implemented using the computing system 100 of FIG. 1, such as through the first device 102 of FIG. 1, the second device 104 of FIG. 1, portions thereof, or a combination thereof. For example, the method 500 can be implemented by operating one or more processors (e.g., central processing units (CPUs), graphics processing units (GPUs), logic circuits, or the like) to execute corresponding instructions that are stored in one or more computer memory devices. In some embodiments, the method 500 can correspond to (1) adding categories for the categorization as described above for FIG. 2 and/or (2) the example profiling process and aspects thereof as described above for FIGS. 2, 4A, and 4B.

The method 500 can include identifying one or more templates as illustrated at block 502. In some embodiments, the computing system 100 can identify the templates by receiving one or more template documents from a user (e.g., the user 202 of FIG. 2). The computing system 100 can use the first device 102 and/or the second device 104 to receive (via, e.g., a definition adding function) one or more template documents that represent archetype documents for corresponding document categories. The template documents can be used as guides for categorizing documents (e.g., binary documents that include non-textual content) according to the corresponding categories. The template documents may each include a text, an image, a comment, a marking, or a combination thereof.

Additionally or alternatively, the computing system 100 can identify the templates by accessing one or more of the categorization profiles 212 of FIG. 2 in the catalog storage 204 of FIG. 2. For example, the computing system 100 can access the profiles requested by or relevant to profiling command from a user (e.g., the user 302 of FIG. 3).

At block 504, the computing system 100 can identify one or more corresponding labels (e.g., the labels 126 of FIG. 1). The identified labels can be the identifiers or names for the categories represented by the corresponding templates. Similar to the templates, the computing system 100 can identify the labels 126 by receiving the labels 126 from the user 202 and/or accessing the categorization profiles 212.

In some embodiments, the computing system 100 can identify a set of templates and corresponding labels for each category. The computing system 100 can use the sets of labeled templates as training data for training one or more machine learning model that can be used to categorize subsequently provided target documents.

At block 506, the computing system 100 can identify similarity function(s) (e.g., the similarity function 214 of FIG. 2) configured to assess and determine similarities between documents. In some embodiments, the computing system 100 can receive the similarity function 214 (e.g., a distance function, such as a minimum edit distance function) or a corresponding selection from the user 202. In other embodiments, the computing system 100 can access the similarity function 214 that was predetermined by the user 202 or the computing system 100 (via, e.g., developers or service providers).

At block 508, the computing system 100 can determine categorization profile(s) (e.g., the categorization profiles 212). The computing system 100 can determine the categorization profiles 212 by associating the template documents with the corresponding labels and storing them. The computing system 100 may further determine processing parameters associated with the categorization. For example, at block 510, the computing system 100 can determine template keys, such as by applying one or more hashing functions (e.g., the first hash 132, the second hash 134, and/or the third hash 136 illustrated in FIG. 1) to the template documents. In other words, the template keys can correspond to the hashing results for the template documents. Also, the computing system 100 can compute a window size (e.g., number of bits) for the rolling window and/or identify one or more trigger conditions (e.g., the reference trigger conditions 440 of FIG. 4), as respectively illustrated at blocks 512 and 514. The computing system 100 can compute the window size and identify the trigger conditions based on user inputs that correspond to selections or highlights of document portions or phrases that are required in or typical of the targeted category of documents. Additionally or alternatively, the computing system 100 can implement one or more machine learning techniques to compute the window size and the trigger conditions that provide the highest categorization accuracy for the training data.

At block 520, the computing system 100 can identify target documents (e.g., the target documents 112). The computing system 100 can receive the target documents 112 from the user 302 and/or access the customer data source (e.g., the first device 102) to obtain the target documents 112. The target documents 112 can be the subjects of the categorization process, which can be initiated by a command or a request (e.g., a profile command) from the user 302.

At block 522, the computing system 100 can categorize the target documents. The computing system 100 can categorize the target documents by comparing them to the template documents and/or by processing the documents using the related parameters. The computing system 100 can generate the categorization results 404 of FIG. 4 for the target documents 112 based on overlaps in the corresponding document and the template documents. When a target document has sufficient amount of overlap, such as defined by the similarity function 214, the computing system 100 can determine the categorization result 404 as the label 126 associated with the overlapping template document. Additionally or alternatively, the computing system 100 can determine the categorization result 404 to include a confidence measure or a degree of overlap associated with the corresponding template document.

Figure 5B:
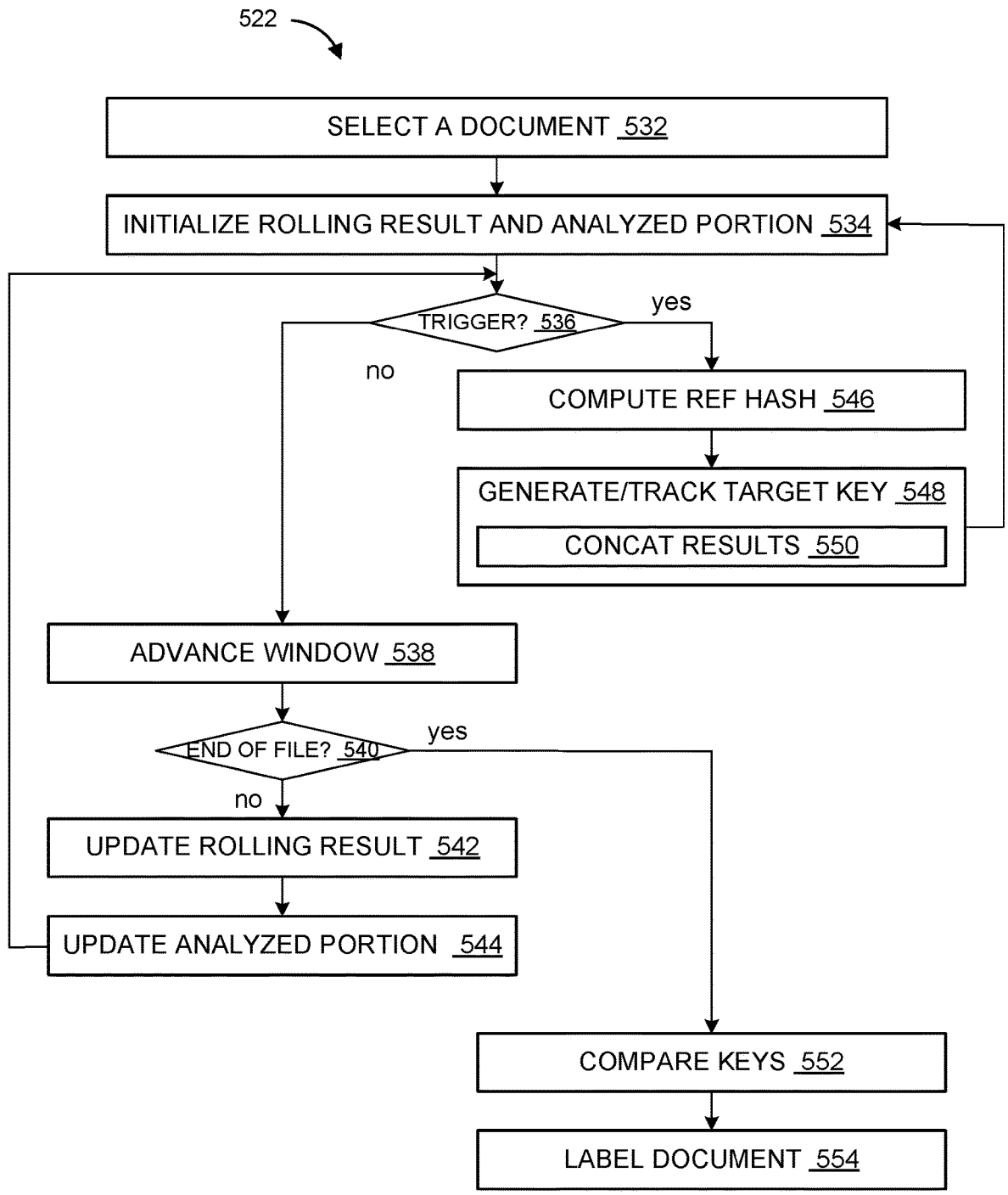
FIG. 5B illustrates an example method for determining a similarity between documents in accordance with one or more embodiments of the present technology.

FIG. 5B illustrates an example method 522 for determining a similarity between documents in accordance with one or more embodiments of the present technology. The method 522 can correspond to an example implementation of the operation described above for block 522 of FIG. 5A.

At block 532, the computing system 100 of FIG. 1 (via, e.g., the second device 104 of FIG. 1) can select a target document (e.g., a binary document). The computing system 100 can iteratively select and analyze a document in the target documents 112 of FIG. 1. For example, the computing system 100 can access a target binary document from the customer data source and/or the memory of the second device 104 for categorization.

The computing system 100 can categorize the selected document by processing the document using a set of hashing operations (e.g., the first hash 132 of FIG. 1, the second hash 134 of FIG. 1, the third hash 136 of FIG. 1, and/or the like). For the example illustrated in FIG. 5B, the computing system 100 can implement a context-based piecewise hash by using the rolling hash 412 of FIG. 4B to trigger the reference hash 414 of FIG. 4B and aggregating the results of the reference hash or portions thereof. The generated hashing result can be used to compare the target document to the template document. When the comparison indicates sufficient overlap or similarity, the computing system 100 can assign the label of the matching template document and/or a corresponding confidence measure to the target document.

For the set of hashing operations, the rolling hash 412 and the reference hash 414 can be implemented as nested loops or iterations. The rolling hash 412 can be implemented by iteratively advancing the rolling window 422 of FIG. 4B across the binary bitstream (e.g., the input stream 410 of FIG. 4B) that corresponds to the target binary document. The second hash 134 can include the predetermined reference hash operation 414 that is triggered according to the rolling hash result. As such, for the iterative implementation, the computing system 100 can initialize a rolling hash result (e.g., the rolling hash result 424 of FIG. 4B) and an analyzed portion (e.g., the analyzed portion 411 of FIG. 4B) as illustrated block 534. The computing system 100 can initialize the rolling hash result by (1) positioning the rolling window 422 at the beginning of a remaining portion of the input stream 410 and (2) computing the rolling hash result 424 for the data within the rolling window 422. The computing system 100 can initialize the analyzed portion 411 as the content within the rolling window 422.

At decision block 536, the computing system 100 can determine whether the rolling result satisfies one or more reference triggering conditions. The computing system 100 can compare the rolling hash result 424 to the reference trigger conditions 440 of FIG. 4B. When the trigger conditions are not satisfied, such as illustrated at block 538, the computing system 100 can advance the rolling window 422 across the input stream by a predetermined number of bits/bytes. The advancing increment may be less than a size of the rolling window 422. Accordingly, a portion of the analyzed data may exit the rolling window while a different portion of the analyzed data remains within the rolling window 422 and is combined with newly entering data.

At decision block 540, the computing system 100 can determine whether the iterative process has reached the end of the target document. In other words, the computing system 100 can determine whether an end-of-file indicator has entered the rolling window 422. If the rolling window has not reached the end of the target binary file, such as illustrated at block 542, the computing system 100 can update the rolling hash result 424. The computing system 100 can update the rolling hash result 424 according to changes in the rolling window 422 across the iterations, such as defined by the data that exited the rolling window 422 and the newly entering data. The computing system 100 can update the rolling hash result 424 using simple mathematical operators (e.g., addition, multiplication, etc.) and bit-wise operators (e.g., shifts, masks, etc.) instead of complex operators, such as for transformations, sampling, and/or full hashing function.

At block 544, the computing system 100 can update the analyzed portion 411, such as by adding or appending the data that exited the rolling window 422 to the previous values within the analyzed portion 411. Accordingly, the computing system 100 can track the analyzed portion 411 across the iterations to include (1) the sequence of bits that have traversed through the rolling window in one or more preceding iterations and/or (2) the content of the rolling window for the current iteration.

Using the process described above, the computing system 100 can iteratively advance the rolling window 422 to examine the target document according to context as defined by the reference trigger conditions 440. For example, the computing system 100 can use the rolling window 422 and the reference trigger conditions 440 to search for binary phrases characteristic of or required for applicable or considered document categories. The iterative process rolling hash can continue until the rolling hash result 424 satisfies one or more of the reference triggering conditions 440. When one or more of the conditions are satisfied, as illustrated at block 546, the computing system 100 can compute the reference hash 414 (e.g., MD5, FNV, or the like) for the analyzed portion 411. Accordingly, the computing system 100 can trigger the reference hash 414 based on contextual evaluations. Further, the computing system 100 can implement the reference hash 414 for dynamically adjusted segments of the target document (e.g., the analyzed portion 411) instead of hashing the entirety of the input stream 410.

At block 548, the computing system 100 can generate and track a target key for the target document. The computing system 100 can generate and track the target key 402 of FIG. 4A for the categorization result 404 of FIG. 4A. For the target key 402, the computing system 100 can generate the reference result 442 of FIG. 4B based on implementing the reference hash 414 for the dynamically/iteratively tracked analyzed portion 411 (having, e.g., lengths that are independent and dynamically set across iterations). The computing system 100 can track the target key 402 by combining the reference results or portions thereof across the multiple sections of the input stream 410 or the corresponding implementations of the reference hash 414.

As an illustrative example, the computing system 100 can compute a first reference result based on implementing the predetermined reference hash for a preceding portion of the binary bitstream. As illustrated by a feedback loop to block 534, the computing system 100 can reset the rolling window and the analyzed portion after computing the first reference result and continue the iterative rolling hash analysis as described above. When the rolling hash operation retriggers the reference hash 414, the computing system 100 can compute a second reference result based on implementing the predetermined reference hash for a subsequent portion of the binary bitstream. The computing system 100 can track the target key 402 by combining the first and second reference results or portions thereof. In the example illustrated in FIG. 5B, the computing system 100 can concatenate multiple reference results or portions thereof (e.g., LSnB) as illustrated in block 550. Accordingly, the computing system 100 can implement a piecewise hashing operation over the target binary document and preserve the contents thereof.

Accordingly, the computing system 100 can implement the context-based piecewise hashing to analyze the target document. When the analysis (e.g., the rolling window) reaches the end of the target document, such as illustrated at block 552, the computing system 100 can compare the target key 402 with the template keys 401 of FIG. 4B. The computing system 100 can compare the keys according to the similarity function 214 of FIG. 2 (e.g., minimum edit distance function). The computing system 100 can generate the categorization result 404 for the analyzed target document according to the comparison. For example, the computing system 100 can identify one or more template documents having the template keys At block 554, the computing system 100 can label the target document according to the comparison of the keys. In other words, the computing system 100 can identify one or more template documents having the template keys that satisfy one or more predetermined conditions (e.g., having a minimum edit distance below a threshold and/or a first x number of documents with the lowest edit distance) with respect to the target key. The computing system 100 can determine that the target document is substantially similar to such template document(s) and assign the corresponding label(s). Additionally or alternatively, the computing system 100 can assign to the target document one or more confidence measures (e.g., the minimum edit distances, the different measures of the likelihood of accuracy, or a combination thereof) associated with the corresponding labels.

The computing system 100 can repeat one or more of the operations described above each document in the target documents 112. Accordingly, one or more of the target documents 112 can each be assigned one or more labels and/or corresponding confidence measures. In some embodiments, the computing system 100 can group the target documents 112 having the same or related labels to identify the categorized groupings 114.

In some embodiments, the computing system 100 can use the method 500, a portion thereof, and/or a derivation thereof to develop one or more machine-learning models for each category/template. For example, the computing system 100 can implement a reinforced learning mechanism that receives a feedback or a confirmation regarding one or more of the categorization results. The computing system 100 can use the results to adjust the window sizes, the trigger patterns, the confidence measure calculations, or other similar parameters for subsequent categorization operations.

Figure 6:
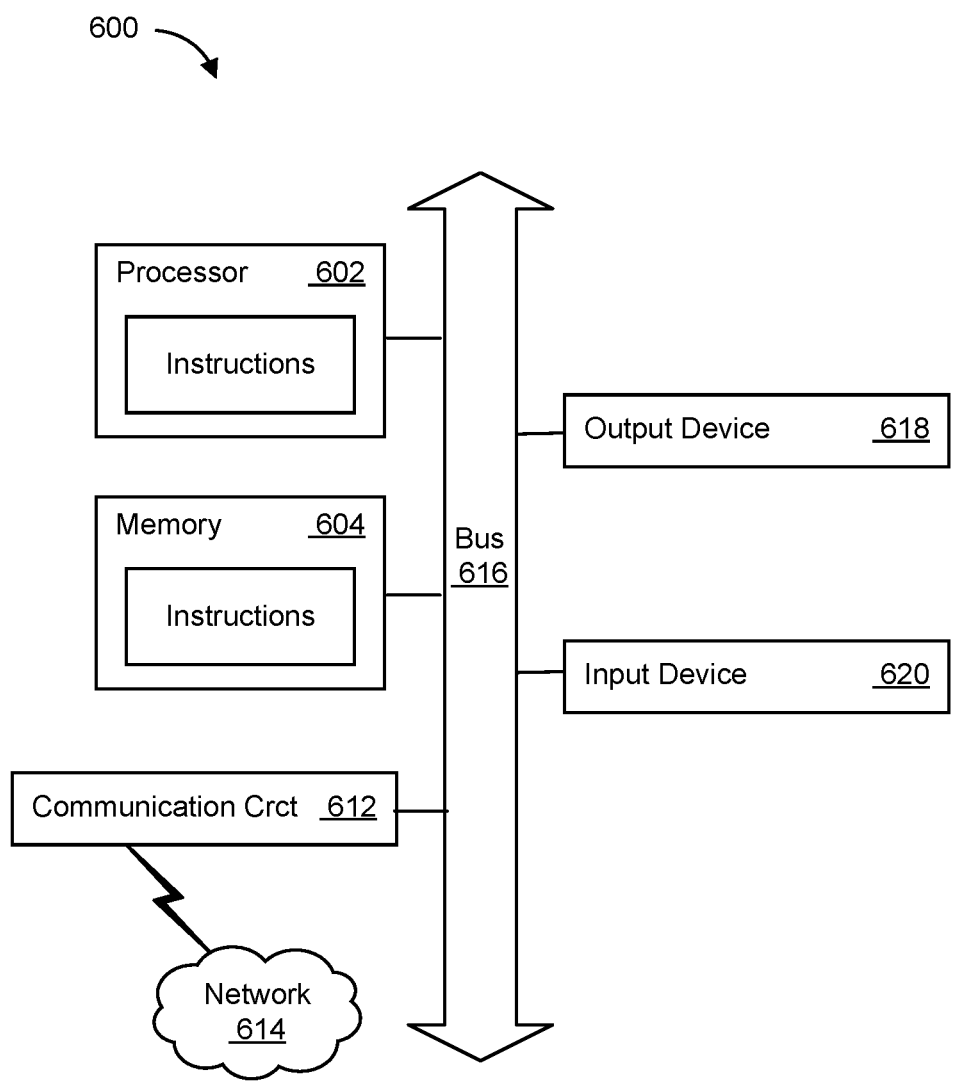
FIG. 6 illustrates a block diagram of an example processing device/system in which at least some operations described herein can be implemented.

FIG. 6 illustrates a block diagram of an example processing device/system (e.g., the computing system 100 of FIG. 1 or one or more portions thereof) in which at least some operations described herein can be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, association information, personal gateway settings, and instructions to perform the methods disclosed herein) may be volatile (such as RAM), non-volatile (such as ROM, flash memory, etc.), or some combination of the two. Further, environment 600 may also include storage devices (removable, and/or non-removable) including, but not limited to, magnetic or optical disks or tape. Similarly, environment 600 may also have input device(s) 620 such as keyboard, mouse, pen, voice input, etc. and/or output device(s) 618 such as a display, speakers, printer, etc. Also included in the environment may be one or more communication circuits 612 that communicatively connect the processing unit 602 to a network 614, such as LAN, WAN, point to point, etc. The processing unit 602 can be coupled to one or more of the devices/circuits using an internal bus 616.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-readable medium storing non-transitory computer executable instructions that, when executed by one or more processors, cause a computing system to perform a method, the method comprising:
   identifying a template document that represents a guide for categorizing one or more binary documents that each include at least one non-textual content;
   accessing a target binary document for categorization;
   generating a categorization result for the target binary document based on comparing the target binary document to the template document, wherein the categorization result comprises—
      processing the target binary document using at least a first hash and a second hash, wherein the second hash is implemented based on the first hash, and
   generating the categorization result based on comparing a result of the second hash to the template document or a derivation thereof.

2. The computer-readable medium of claim 1, wherein:
   accessing the target binary document includes accessing a template key corresponding to a hashing result associated with the template document; and
   the categorization result corresponds to overlaps between the template key and the result of the second hash according to a similarity function configured to quantitatively represent similarities between documents based on the overlaps.

3. The computer-readable medium of claim 2, wherein the similarity function is configured to calculate a minimum edit distance between the template key and the result of the second hash, wherein the minimum edit distance represents a similarity measurement for the template document and the target binary document.

4. The computer-readable medium of claim 1, wherein the instructions correspond to the method that further comprises:
   receiving the template document and a corresponding label, wherein generating the categorization result includes assigning (1) the label and/or (2)
   a corresponding confidence measure to the target binary document.

5. The computer-readable medium of claim 1, wherein:
   the first hash is a rolling hash that iteratively generates a rolling hash result based on examining an iteratively updated portion of the target binary document; and
   the second hash is a predetermined reference hash that is triggered according to the rolling hash result.

6. The computer-readable medium of claim 5, wherein processing the target binary document includes triggering the second hash when the rolling hash result satisfies a reference trigger condition that represents a binary phrase characteristic of or required for a document category associated with the template document.

7. The computer-readable medium of claim 5, wherein processing the target binary document includes:
   iteratively advancing a rolling window across a binary bitstream that corresponds to the target binary document, wherein
   generating the rolling hash result includes updating the rolling hash result according to changes in a content within the rolling window from a preceding iteration to a current iteration;
   tracking an analyzed portion of the binary bitstream, wherein the analyzed portion includes (1) a sequence of bits that have traversed through the rolling window in one or more preceding iterations and/or (2) the content of the rolling window for the current iteration; and
   processing the analyzed portion with the predetermined reference hash when the content of the rolling window for the current iteration satisfies a reference trigger condition.

8. The computer-readable medium of claim 7, wherein processing the target binary document includes generating a target key by:
   computing a first reference result based on implementing the predetermined reference hash for a preceding portion of the binary bitstream;
   resetting the analyzed portion after computing the first reference result;
   computing a second reference result based on implementing the predetermined reference hash for a subsequent portion of the binary bitstream based on retriggering the predetermined reference hash according to the content captured in the rolling window; and
   generating the target key based on combining the first and second reference results or portions thereof, wherein the generated target key represents a result of implementing a piecewise hashing over the target binary document to preserve contents thereof.

9. The computer-readable medium of claim 8, wherein the target key corresponds to concatenated results or portions thereof from multiple implementations of the predetermined reference hash that is (1) triggered according to one or more reference triggering conditions that represent context parameters and (2) implemented over segments of the target binary document that have independent lengths.

10. The computer-readable medium of claim 1, wherein the template document includes a text, an image, a comment, a marking, or a combination thereof for representing an archetype for a category of documents.

11. A system for categorizing documents, the system comprising:
   one or more processors;
   one or more computer memory storing instructions for execution by the one or more processors, the instructions comprising—
      receiving one or more template documents that each represents an archetype for a category of documents;
      accessing a set of target binary documents for categorization, wherein each of the target binary documents includes at least one non-textual content;
      identifying one or more categorized groupings for the set of target binary documents, wherein the one or more categorized groupings are identified based on comparing the set of target binary documents to the one or more template documents, wherein the set of target binary documents are grouped by—
         processing the set of target binary documents using at least a first hash and a second hash, wherein the second hash is implemented based on the first hash, and
         generating categorization results for the set of target binary documents based on comparing results of the second hash to the one or more template documents or one or more derivations thereof.

12. The system of claim 11, wherein the processor instructions include:

obtaining a template key for each document in the set of target binary documents, wherein the template key is a hashing result for the corresponding binary document; and the categorization result corresponds to overlaps between the template key and the result of the second hash according to a similarity function configured to quantitatively represent similarities between documents based on the overlaps.

13. The system of claim 11, wherein:

the first hash is a rolling hash that iteratively generates a rolling hash result based on examining an iteratively updated portion of the target binary document; and the second hash is a predetermined reference hash that is triggered according to the rolling hash result.

14. The system of claim 13, wherein identifying the one or more categorized groupings includes:

iteratively advancing a rolling window across a binary bitstream that corresponds to the target binary document;

for one or more iterations, updating a rolling hash result according to changes in a content within the rolling window from a preceding iteration to a current iteration;

tracking an analyzed portion of the binary bitstream across one or more iterations, wherein the analyzed portion includes (1) a sequence of bits that have been previously analyzed within the rolling window in one or more preceding iterations and/or (2) the content of the rolling window for the current iteration; and processing the analyzed portion with the predetermined reference hash when the content of the rolling window for the current iteration satisfies a reference trigger condition.

15. The system of claim 13, wherein identifying the one or more categorized groupings includes, for each of the target binary documents:

computing a first reference result based on implementing the predetermined reference hash for a preceding portion of the binary bitstream;

computing a second reference result based on implementing the predetermined reference hash for a subsequent portion of the binary bitstream; and generating a corresponding key based on combining the first and second reference results or portions thereof, wherein the generated key represents a result of implementing a piecewise hashing over the processed binary document to preserve contents thereof.

16. A method of categorizing documents, the method comprising:

receiving a template document that represents a guide for categorizing one or more binary documents that each include at least one non-textual content;

accessing a target binary document for categorization;

generating a categorization result for the target binary document based on comparing the target binary document to the template document, wherein the categorization result comprises— processing the target binary document using at least a first hash and a second hash, wherein the second hash is implemented based on the first hash, and generating the categorization result based on comparing a result of the second hash to the template document or a derivation thereof.

17. The method of claim 16, wherein:

accessing the target binary document includes accessing a template key corresponding to a hashing result associated with the template document; and the categorization result corresponds to overlaps between the template key and the result of the second hash according to a similarity function configured to quantitatively represent similarities between documents based on the overlaps.

18. The method of claim 16, wherein:

receiving the template document includes receiving a label associated with the template document and a representative category; and generating the categorization result includes assigning (1) the label and/or (2) a corresponding confidence measure to the target binary document.

19. The method of claim 16, wherein processing the target binary document includes:

for the first hash— iteratively advancing a rolling window across a binary bitstream that corresponds to the target binary document;

generating a first hash result based on updating a preceding result according to changes in a content within the rolling window from a preceding iteration to a current iteration;

tracking an analyzed portion of the binary bitstream iterations, wherein the analyzed portion includes (1) a sequence of bits that have traversed through the rolling window in one or more preceding iterations and/or (2) the content of the rolling window for the current iteration; and processing the analyzed portion with the second hash when the content of the rolling window for the current iteration satisfies a reference trigger condition that represents a binary phrase characteristic of or required for a document category associated with the template document.

20. The method of claim 16, wherein processing the target binary document includes:

computing a first reference result based on implementing the second hash for a preceding portion of the binary bitstream;

computing a second reference result based on implementing the second hash for a subsequent portion of the binary bitstream; and generating a corresponding key based on combining the first and second reference results or portions thereof, wherein the generated key represents a result of piecewise hashing the processed binary document to preserve contents thereof.

* * * * *